(12) United States Patent
Lin et al.

(10) Patent No.: US 8,010,321 B2
(45) Date of Patent: Aug. 30, 2011

(54) METRICS INDEPENDENT AND RECIPE INDEPENDENT FAULT CLASSES

(75) Inventors: Y. Sean Lin, Irvine, CA (US); William R. Clements, III, Austin, TX (US); Alexander T. Schwarm, Austin, TX (US)

(73) Assignee: Applied Materials, Inc., Santa Clara, CA (US)

( * ) Notice: Subject to any disclaimer, the term of this patent is extended or adjusted under 35 U.S.C. 154(b) by 956 days.

(21) Appl. No.: 11/800,460

(22) Filed: May 4, 2007

(65) Prior Publication Data

US 2008/0276128 A1 Nov. 6, 2008

(51) Int. Cl.
*G06F 3/01* (2006.01)
*G06F 11/07* (2006.01)
*G21C 21/02* (2006.01)
*H04B 3/46* (2006.01)

(52) U.S. Cl. ......... 702/185; 702/179; 702/183; 702/189
(58) Field of Classification Search .................... 702/81, 702/84, 97, 99, 127, 134, 155, 179, 183, 702/185, 189; 701/214; 714/25, 26, 37; 717/124

See application file for complete search history.

(56) References Cited

U.S. PATENT DOCUMENTS

| | | | |
|---|---|---|---|
| 5,442,562 A | 8/1995 | Hopkins et al. | |
| 5,544,308 A | 8/1996 | Giordano et al. | |
| 5,694,401 A | 12/1997 | Gibson | |
| 6,202,181 B1 | 3/2001 | Ferguson et al. | |
| 6,560,736 B2 | 5/2003 | Ferguson et al. | |
| 6,615,366 B1 | 9/2003 | Grochowski et al. | |
| 6,625,688 B1 | 9/2003 | Fruehling et al. | |
| 6,678,569 B2 | 1/2004 | Bunkofske et al. | |
| 6,868,342 B2 | 3/2005 | Mutter et al. | |
| 6,907,545 B2 * | 6/2005 | Ramadei et al. | 714/25 |
| 6,954,883 B1 | 10/2005 | Coss, Jr. et al. | |
| 6,954,884 B2 | 10/2005 | Dean et al. | |
| 7,062,411 B2 | 6/2006 | Hopkins et al. | |
| 7,072,794 B2 | 7/2006 | Wittkowski | |
| 7,079,677 B2 | 7/2006 | Tai et al. | |
| 7,089,154 B2 | 8/2006 | Rasmussen et al. | |
| 7,151,976 B2 | 12/2006 | Lin | |

(Continued)

FOREIGN PATENT DOCUMENTS

CN 2009081863 2/2009

(Continued)

OTHER PUBLICATIONS

Case Study: "Automated Fault Detection and Diagnostic Software", New Buildings Institute, http://www.archenergy.com/pier-fdd/market_connection/proj7_Deliverables/FD-DAlgorithmsCaseStudyFinal.pdf. Apr. 17, 2007, 4 pages.

(Continued)

*Primary Examiner* — Michael P Nghiem
*Assistant Examiner* — Felix E Suarez
(74) *Attorney, Agent, or Firm* — Blakely, Sokoloff, Taylor & Zafman, LLP

(57) ABSTRACT

A method and apparatus for diagnosing faults. Process data is analyzed using a first metric to identify a fault. The process data was obtained from a manufacturing machine running a first recipe. A fault signature that matches the fault is identified. The identified fault signature was generated using a second metric and/or a second recipe. At least one fault class that is associated with the fault signature is identified.

29 Claims, 5 Drawing Sheets

U.S. PATENT DOCUMENTS

| | | | |
|---|---|---|---|
| 7,413,546 | B2 | 8/2008 | Agutter et al. |
| 7,587,296 | B2 | 9/2009 | Harvey, Jr. et al. |
| 7,596,718 | B2 * | 9/2009 | Harvey et al. .................. 714/25 |
| 7,765,020 | B2 | 7/2010 | Lin et al. |
| 7,831,326 | B2 | 11/2010 | Lin et al. |
| 2002/0143472 | A1 | 10/2002 | Mutter et al. |
| 2003/0109951 | A1 | 6/2003 | Hsiung et al. |
| 2003/0171897 | A1 | 9/2003 | Bieda et al. |
| 2003/0195675 | A1 | 10/2003 | Felke et al. |
| 2003/0225466 | A1 | 12/2003 | Yulevitch et al. |
| 2004/0002842 | A1 | 1/2004 | Woessner |
| 2004/0024543 | A1 | 2/2004 | Zhang et al. |
| 2004/0110310 | A1 | 6/2004 | Sun et al. |
| 2004/0210850 | A1 | 10/2004 | Bermudez et al. |
| 2004/0254762 | A1 | 12/2004 | Hopkins et al. |
| 2005/0010117 | A1 | 1/2005 | Agutter et al. |
| 2005/0060103 | A1 | 3/2005 | Chamness |
| 2005/0114023 | A1 * | 5/2005 | Williamson et al. .......... 701/214 |
| 2005/0114743 | A1 | 5/2005 | Moorhouse |
| 2006/0111804 | A1 | 5/2006 | Lin |
| 2006/0149990 | A1 | 7/2006 | S. et al. |
| 2006/0184264 | A1 | 8/2006 | Willis et al. |
| 2007/0006037 | A1 | 1/2007 | Sargusinsh et al. |
| 2007/0021859 | A1 | 1/2007 | Lev-Ami et al. |
| 2007/0028220 | A1 * | 2/2007 | Miller et al. ................. 717/124 |
| 2007/0038418 | A1 | 2/2007 | Ahn et al. |
| 2007/0067678 | A1 * | 3/2007 | Hosek et al. .................... 714/25 |
| 2008/0015726 | A1 | 1/2008 | Harvey et al. |
| 2008/0125898 | A1 | 5/2008 | Harvey et al. |
| 2008/0276128 | A1 | 11/2008 | Lin et al. |
| 2008/0276136 | A1 | 11/2008 | Lin et al. |

FOREIGN PATENT DOCUMENTS

| | | |
|---|---|---|
| CN | 101438249 A | 5/2009 |
| WO | WO 2007/133543 | 11/2007 |
| WO | WO2008/137062 | 11/2008 |

OTHER PUBLICATIONS

Chen, Kuang-Han et al., "Multivariate Statistical Process Control and Signature Analysis Using Eigenfactor Detection Methods", 2001, pp. 1-21.

Gallagher, Neal B. et al., "Development and Benchmarking of Multivariate Statistical Process Control Tools for a Semiconductor Etch Process: Improving Robustness Through Model Updating" *Eigenvector-Research Inc.*, Manson, WA, USA, 1997, 6 pages.

Office Action for U.S. Appl. No. 11/800,461 mailed Jul. 3, 2008.

Office Action for U.S. Appl. No. 11/800,471 mailed Aug. 5, 2008.

Li, W., et al. "Recursive PCA for Adaptive Process Monitoring", J. Process Control, vol. 10, p. 471-486, 2000.

PCT International Search Report and Written Opinion for International Application No. PCT/US08/05667, mailed Aug. 18, 2008, 11 pages.

PCT International Search Report and Written Opinion for International Application No. PCT/US07/11106, mailed Jul. 14, 2008, 8 pages.

PCT International Search Report and Written Opinion for International Application No. PCT/US07/11142, mailed Jul. 28, 2008, 11 pages.

Spitzlsperger, Gerhard et al. "Fault Detection for a VIA Etch Process Using Adaptive Multivariate Methods" ISSM Tokyo 2004, p. 528-533.

Applied Materials, Inc., Notice of Allowance for U.S. Appl. No. 11/800,461 mailed Mar. 3, 2009. (8090P004).

Applied Materials, Inc., Supplemental Notice of Allowance for U.S. Appl No. 11/800,461, mailed Jun. 1, 2009m (8090P004).

Applied Materials, Inc., Office Action for U.S. Appl. No. 12/004,667 mailed Jun. 22, 2009, (8090P004C).

Applied Materials, Inc., Office Action for U.S. Appl. No. 12/004,667 mailed Jan. 5, 2010, (8090P004C).

Applied Materials, Inc., Office Action for U.S. Appl. No. 11/800,471 mailed Feb. 3, 2009 (8090P005).

Applied Materials, Inc., Notice of Allowance for U.S. Appl. No. 11/800,471 mailed May 27, 2009 (8090P005).

Applied Materials, Inc., Office Action for U.S. Appl. No. 11/800,462 mailed Apr. 2, 2009 (8090P026).

Applied Materials, Inc., Notice of Allowance for U.S. Appl. No. 11/800,462 mailed Sep. 24, 2009 (8090P026).

Applied Materials, Inc. Office Action for U.S. Appl. No. 11/985,603 mailed Apr. 8, 2009 (8090P026C).

Applied Materials, Inc. Office Action for U.S. Appl. No. 11/985,603 mailed Nov. 20, 2009 (8090P026C).

Conlin, A.K., et al., "Confidence Limits for Contribution Plots," J. Chemometrics 2001, vol. 14, pp. 725-736.

Qin, S. Joe, et al., "On Unifying Multiblock Analysis with Application to Decentralized Process Monitoring," J. Chemometrics 2001, vol. 15, pp. 715-742.

Westerhuis, Johan A., et al., "Generalized Contribution Plots in Multivariate Statistical Process Monitoring," Chemometrics and Intelligent Laboratory Systems 2000, vol. 51, pp. 95-114.

Applied Materials, Inc. Office Action for U.S. Appl. No. 12/004,667 mailed Jul. 8, 2010.

Applied Materials, Inc. Notice of Allowance for U.S. Appl. No. 11/985,603 mailed Apr. 6, 2010.

Applied Materials, Inc. Office Action for U.S. Appl. No. 12/004,667 mailed Jul. 8, 2010, (8090P004C).

Applied Materials, Inc. Notice of Allowance for U.S. Appl. No. 12/004,667 mailed Dec. 20, 2010, (8090P004C).

Applied Materials, Inc. Supplement Notice of Allowance for U.S. Appl. No. 11/800,462 mailed Mar. 15, 2010, (8090P026).

* cited by examiner

METRICS INDEPENDENT AND RECIPE INDEPENDENT FAULT CLASSES

TECHNICAL FIELD

Embodiments of the present invention relate to fault diagnosis, and more specifically to fault diagnosis using recipe independent fault classes and/or metrics independent fault classes.

BACKGROUND

Many industries employ sophisticated manufacturing equipment that includes multiple sensors and controls, each of which may be carefully monitored during processing to ensure product quality. One method of monitoring the multiple sensors and controls is statistical process monitoring (a means of performing statistical analysis on sensor measurements and process control values (process variables)), which enables automatic detection and/or diagnosis of faults. A "fault" can be a malfunction or maladjustment of manufacturing equipment (e.g., deviation of a machine's operating parameters from intended values), or an indication of a need for preventive maintenance to prevent an imminent malfunction or maladjustment. Faults can produce defects in the devices being manufactured. Accordingly, one goal of statistical process monitoring is to detect and/or diagnose faults before they produce such defects.

During process monitoring, a fault is detected when one or more of the statistics of recent process data deviate from a statistical model by an amount great enough to cause a model metric to exceed a respective confidence threshold. A model metric is a scalar number whose value represents a magnitude of deviation between the statistical characteristics of process data collected during actual process monitoring and the statistical characteristics predicted by the model. Each model metric is a unique mathematical method of estimating this deviation. Conventional model metrics include Squared Prediction Error (commonly referred to as SPE, Qres, or Q), and Hotelling's T2 (T2).

Each model metric has a respective confidence threshold, also referred to as a confidence limit or control limit, whose value represents an acceptable upper limit of the model metric. If a model metric exceeds its respective confidence threshold during process monitoring, it can be inferred that the process data has aberrant statistics because of a fault.

Once faults are detected, they are diagnosed by estimating a relative fault contribution of each process variable as determined by a specific model metric. The estimated fault contribution is used to generate a fault signature and/or a fault class for that model metric. Conventionally, the fault class and fault signature are associated with a specific model metric, and may not be used with other model metrics.

Fault classes and fault signatures are conventionally associated with specific processes and/or recipes run on specific manufacturing machines. Such conventional fault classes and fault signatures are not useable with recipes, processes or machines other than the machine, process and recipe for which they were generated.

BRIEF DESCRIPTION OF THE DRAWINGS

The present invention is illustrated by way of example, and not by way of limitation, in the figures of the accompanying drawings and in which.

DETAILED DESCRIPTION

Figure 1:
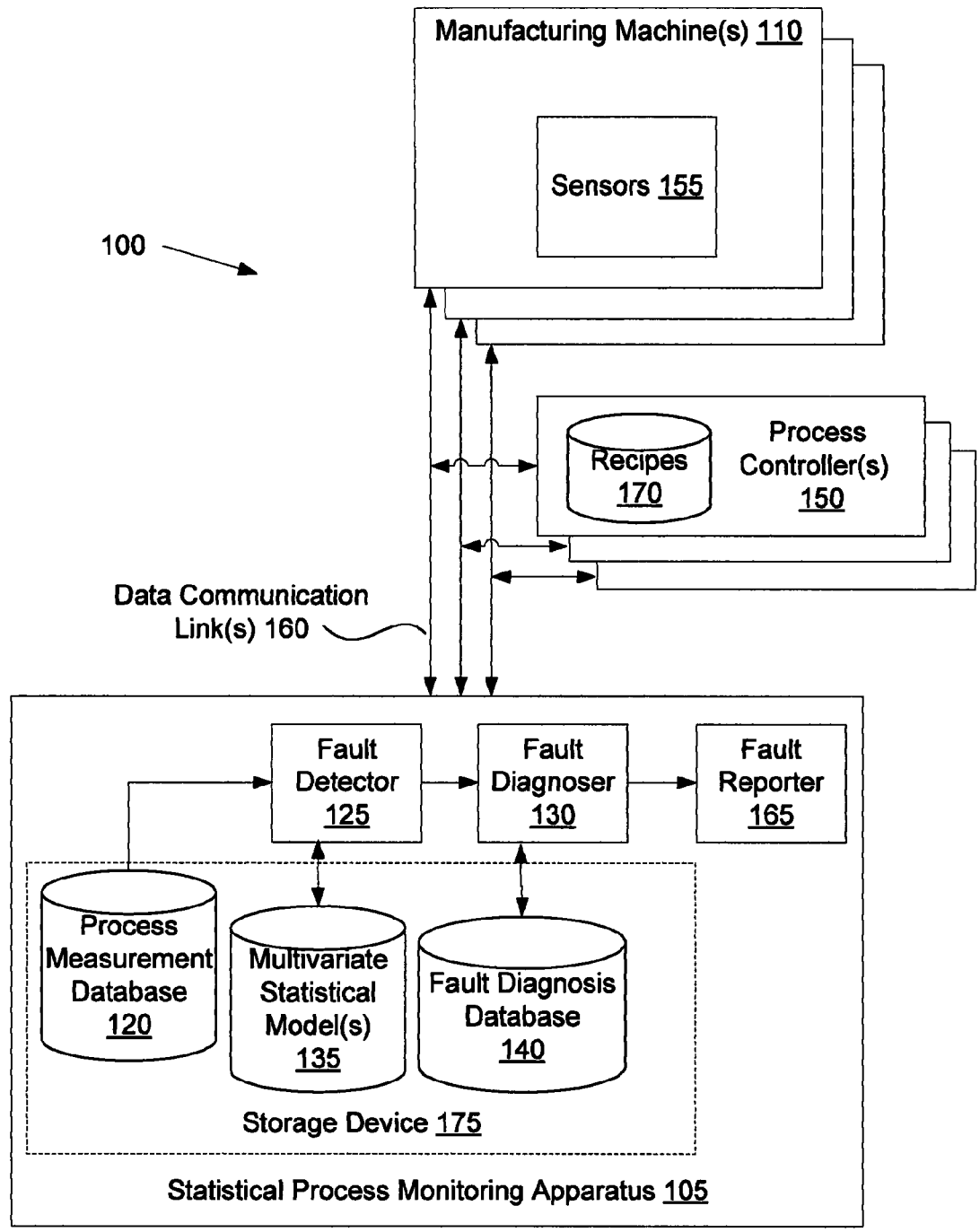
FIG. 1 illustrates one embodiment of a statistical process monitoring system.

Described herein is a method and apparatus for diagnosing faults. In one embodiment, process data is analyzed using a first metric to identify a fault. The process data may be process data that was obtained from a manufacturing machine running a first recipe. The manufacturing machine may be an etcher, chemical vapor deposition (CVD) furnace, implanter, etc. The first recipe may be a process recipe to etch a work piece, to deposit a layer on the work piece, to dope the work piece with impurities, etc. The first metric may be the Q metric, the T2 metric, a combined multivariate index (CMI) metric, etc. A fault signature is identified that matches the fault. In one embodiment, the fault signature was previously generated using a second metric and/or a second recipe. At least one fault class is identified that is associated with the fault signature.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

The following description provides details of a statistical process monitoring system that monitors processes run on manufacturing devices to detect and/or diagnose faults (manufacturing irregularities). In one embodiment, the statistical process monitoring system is for use in the manufacturing of electronic devices (e.g., semiconductors). Manufacturing such devices generally requires dozens of manufacturing steps involving different types of manufacturing processes. For example, etching, sputtering, and chemical vapor deposition are three different types of processes, each of which is performed on different types of machines. Alternatively, the statistical process monitoring system may be used to monitor the manufacture of other products, such as automobiles. The manufacture of such other products may also require many different processing steps by various manufacturing machines.

FIG. 1 illustrates one embodiment of a statistical process monitoring system 100. The statistical process monitoring system 100 includes a statistical process monitoring apparatus 105 coupled with one or more manufacturing machines 110 and one or more process controllers 150 by data communication links 160. The statistical process monitoring system 100 may include all manufacturing machines 110 in a factory (e.g., a fabrication facility). Alternatively, the statistical process monitoring system 100 may include only some manufacturing machines 110 in the factory, such as all of the manufacturing machines 110 that run one or more specific processes.

In one embodiment, each of the manufacturing machines 110 is a machine for the manufacture of electronic devices, such as etchers, chemical vapor deposition (CVD) furnaces, photolithography devices, implanters, etc. Alternatively, the manufacturing machines 110 may be of a type for manufacturing other products (e.g., automobiles). In one embodiment, each of the manufacturing machines 110 is of a single type. Alternatively, the manufacturing machines 110 may include multiple different types of equipment, each of which may run different processes.

Each of the manufacturing machines 110 may include multiple sensors for monitoring processes run on the manufacturing machines 110. One type of sensor that may be included in the manufacturing machine is a temperature sensor. Examples of other sensors include pressure sensors, flow rate sensors, or any other sensors that monitor physical conditions of a manufacturing process or physical properties of a work piece manufactured by the manufacturing machines 110.

Each manufacturing process that is performed on a manufacturing machine 110 is characterized by various physical conditions and properties measured by the sensors, and by various operating parameters, collectively referred to as process data. Each distinct physical condition or property measured by sensors, and each operating parameter, may be a distinct process variable of the process data. Examples of process variables representing sensor data include chamber pressure, susceptor temperature, RF forward power, and RF reflected power. Examples of process variables representing operating parameters include flow rate settings (e.g., of chemical reagents), and throttle valve settings (e.g., for a chamber exhaust vacuum pump). The sensors, manufacturing machines and process controllers may be monitored during processing to gather the process variables at successive points in time.

In one embodiment, each process variable applies to a specific process. Alternatively, one or more process variables may apply to only portions of a specific process. In one embodiment, sensor measurements and operating parameters for different steps in a process represent distinct process variables (modeled as additional dimensions in model space). This may be useful, for example, if a manufacturing process being performed in a machine has multiple steps with different operating parameter settings. For example, in a three step manufacturing process, a susceptor temperature during the three steps would be treated as three distinct process variables. The division of process steps into separate dimensions in model space may be advantageous, for example, when a single process deposits multiple layers on a workpiece, or when different steps of a process expose the workpiece to different process conditions (e.g., pressure, temperature, etc.).

Process controllers 150 control operating parameters of manufacturing machines 110. For example, process controllers 150 may control chamber temperature, vacuum pumps, gas injection systems, etc. of manufacturing machines 110. Process controllers 150 may store one or more process recipes (recipes) 160. Each recipe 160 may define operating parameters of a manufacturing machine 110 at each step of a process. In one embodiment, recipes 160 may be loaded into manufacturing machines 110 by process controllers 150.

Data communication links 160 may include conventional communication links, and may be wired or wireless. Data may be transmitted between the manufacturing machines 110, the process controllers 150 and the statistical process monitoring apparatus 105 in a raw or processed format. In one embodiment, a semiconductor equipment communications standards (SECS) interface is used. In other embodiments, a generic model for communications and control of manufacturing equipment (GEM) interface, a SECS/GEM interface, a high speed SECS message services (HSMS) interface, etc., may be used.

The statistical process monitoring apparatus 105 may be a single server that analyzes incoming process data from the manufacturing machines 110, sensors 155 and process controllers 150. Alternatively the statistical process monitoring apparatus 105 may include multiple servers and/or computers. The statistical process monitoring apparatus 105 in one embodiment includes a fault detector 125, a fault diagnoser 130 and a fault reporter 150. The statistical process monitoring device 105 may also include a storage device 175. In one embodiment, the statistical process monitoring apparatus 105 is included in one or more of the process controllers 150. Alternatively, the process monitoring apparatus 105 may be a distinct separate apparatus.

Storage device 175 may include a process measurement database 120, one or more multivariate statistical models 135, and a fault diagnosis database 140. In one embodiment, the storage device 175 is a single storage device of a computer or server of the statistical process monitoring apparatus 105. Alternatively, the storage device 175 may be external to the statistical process monitoring apparatus 105. In one embodiment, the storage device 175 includes multiple storage devices, some of which may include redundant copies of data for backup.

Process measurement data (process data) may be stored in process measurement database 120. The stored process data may be used to show drifts and trends for each of the manufacturing machines 110, for processes run on the manufacturing machines 110, etc. In one embodiment, the stored process data is used to generate one or more multivariate statistical models 135, as described below. Once generated, the multivariate statistical models 135 may be stored in storage device 175.

Fault diagnosis database 140 includes multiple fault classes and fault signatures, which are described in greater detail below. In one embodiment, fault diagnosis database 140 is a relational database. For example, fault diagnosis database 140 my include a fault classes table that stores a list of fault classes, and a related fault signatures table that stores defining characteristics of fault signatures.

In one embodiment, a training period is used to collect data for the generation of one or more multivariate statistical models. The training period covers a collection of process runs of a specific manufacturing process completed under known and/or controlled conditions on a particular manufacturing machine or manufacturing machines. Process data gathered from process runs completed during the training period may be used to generate statistics such as mean, variance, covariance matrix, etc. These statistics are used collectively to generate one or more multivariate statistical models 135, generally for a specific process or recipe that runs on a specific machine.

An initial set of fault signatures can be created and added to the fault diagnosis database 140 based on process data collected during the training period. A fault signature is a characterization of process conditions representative of a specific fault or faults. The fault signature may be a list, table, or other data structure that includes process variables that contribute to a specific fault or faults. The initial set of fault signatures may be generated automatically when the one or more multivariate statistical models 135 are generated.

An initial fault class may be created for each initial fault signature. The fault class may be generated before or after generation of the fault signature. A fault class identifies and/or characterizes a specific fault cause. The process data used to generate an initial fault signature may be based on a process run that is known to have produced a good product (product that meets quality requirements). Since the product is good, any fault that occurred during its generation is likely to be a nuisance fault (e.g., have little or no impact on final yield). Accordingly, a false alarm fault class may be generated, and associated with the fault signature that was generated for the nuisance fault. A separate false alarm fault class may be generated for each nuisance fault that occurs during the training period. Where multiple faults produce the same fault signature, a single fault signature and a single fault class may be generated. False alarm fault classes may be used to suppress future false alarms, and thus reduce down time of manufacturing machines 110 caused by the false alarms.

In one embodiment, faults are intentionally induced during the training period to generate fault classes and fault signatures. A fault may be intentionally induced, for example, by causing a temperature to exceed a preset threshold, by causing an amount of gas to be introduced into a processing chamber that exceeds a recipe limit, etc. Fault signatures may be created for each of the induced faults, and fault classes may be generated and associated with the fault signatures. Thereby, known probable faults may be characterized to improve future fault detection and/or fault diagnosis.

In one embodiment, historical process data is used to generate fault signatures and fault classes. Historical process data is process data that was collected prior to the generation of a current multivariate statistical model. For example, historical process data may include all process data that was collected before a training period is initiated.

Generally, it is known for whether product ultimately produced by process runs from which process data was collected was good product (e.g., within specification limits). Therefore, fault signatures may be generated for faults caused by process data from historical good process runs (process runs that ultimately produced good product), and associated with a new false alarm fault class. Fault signatures and fault classes may also be generated for faults caused by process data from historical bad process runs (process runs that caused scrap, yield loss, etc.). In the case of fault classes generated based on historical bad process runs, if an ultimate cause of the bad process run is known, the fault class indicates the known cause. If the ultimate cause is not known (e.g., not stored along with the process data), a fault class of a type "unidentified" may be generated. Use of historical process data may reduce an amount of time dedicated to the training period.

In one embodiment, fault classes and fault signatures are generated automatically based on historical process data and/or training process data. The automatic generation of such fault signatures and fault classes may occur when one or more multivariate statistical models 135 are generated. Thereby, fault classes and fault signatures may be available to diagnose faults before any customer product is processed. Fault signatures may be automatically generated for each fault in the historical data and/or training data. Fault signatures that are the same or similar may be combined, and associated with a single fault class that is automatically generated. If, for example, two hundred faults are detected from the historical data, and those two hundred faults represent twenty different fault signatures, then twenty fault classes may be automatically generated.

In one embodiment, the generation of fault classes and fault signatures from historical and/or training data is completely automated. Alternatively, one or more steps in the generation of a fault class may require user input. For example, once one or more fault classes are automatically generated, user input may be required to identify an actual fault cause for each fault class. User input may also define a severity level for each fault.

In one embodiment, each multivariate statistical model applies to only a single manufacturing machine. Alternatively, process data from two or more manufacturing machines 110 of a matching machine type may be aggregated to establish a single fault diagnosis model (multivariate statistical model) that may apply to one or more processes run on the two or more manufacturing machines 110. Moreover, a fault diagnosis model developed for a first manufacturing machine may be applied to a second machine of the same type (e.g., same model).

Each multivariate statistical model 135 may include one or more model metrics. Model metrics are scalar values that characterize an amount of deviation between a set of process data and a model. In one embodiment, the model metrics include Squared Prediction Error (commonly referred to as SPE, Qres, or Q) and Hotellings T2. Model metrics may also include combined metrics such as the Combined Multivariate Index (CMI). Each of these metrics is a different method of estimating the probability that process data being monitored has the same statistics as training data that was used to build the model. The aforesaid statistics and metrics may be calculated in accordance with conventional statistics algorithms.

One or more of the multivariate models may utilize Principal Components Analysis (PCA) to transform an M-dimensional process variable space to an N-dimensional space of mutually orthogonal principal components, where M is the number of process variables, and N is much smaller than M. PCA calculates a set of M eigenvectors and M eigenvalues, where each respective eigenvector transforms process variable data to a respective dimension of the principal component space, and each eigenvalue is proportional to the amount of variance represented by a corresponding eigenvector. To simplify (reduce the dimension of) the principal component space, the N eigenvectors corresponding to the N largest eigenvalues are retained in the model; the other eigenvectors are discarded or ignored. The number N of principal components retained in the model is a parameter of the model that may be user selected. The number of principal components (N) may be chosen based on a tradeoff between a model explaining less of the data variance when using a smaller value of N and the model being over-specified when using a larger value of N.

Once one or more multivariate statistical models have been generated, they may be used by fault detector 125 to monitor processes run on manufacturing machines 110. Fault detector 125 analyzes process data by executing various statistical process monitoring methods, each of which is based on at least one multivariate statistical model. In one embodiment, fault detector 125 receives process measurement data (process data) directly from the manufacturing machines 110, sensors 155 and/or process controllers 150. In another embodiment, fault detector 125 may receive process data from the process measurement database 120. In yet another embodiment, fault detector 125 receives process data from both sources.

To detect faults, fault detector 125 calculates statistics of process data for processes being monitored, and compares the calculated statistics with corresponding statistics of appropriate multivariate statistical models. The statistics may be compared for one model metric, or for multiple model metrics (e.g., T2, SPE, CMI). If one or more of the model metrics exceeds a predetermined threshold (referred to as a confidence limit or control limit), a fault may be detected. In one embodiment, each model metric has a threshold value that is user selected. The chosen threshold may represent a compromise between risk of a false alarm (if the threshold is too low) and risk of failing to detect a fault (if the threshold is too high). Where multiple metrics are calculated, faults may be triggered if any one of the metrics exceeds threshold values. Alternatively, some faults may be triggered only if certain metrics exceed threshold values or only if multiple metrics exceed threshold values.

Once a fault has been identified by the fault detector 125, the fault is analyzed by fault diagnoser 130. Fault diagnoser 130 compares the fault to a collection of fault signatures stored in the fault diagnosis database 140. Each fault signature represents process conditions representative of a specific fault or faults. In one embodiment, fault signatures are ranked lists of process variables that have a greatest statistical contribution to a specific fault or faults. The process variables may be ranked in the order of relative magnitudes of their respective contributions. Alternatively, fault signatures may include tables, trees, or other data structures that rank process variables based on statistical contributions to a fault. Fault diagnoser 130 may compare each stored fault signature to a ranked list of process variables having greatest contributions for a current fault. When there is a high degree of similarity between one of the fault signatures and the current fault, a match is reported.

Relative contributions of process variables as calculated by a first metric may not be the same as the relative contributions of process variables as calculated by a second metric. In some cases the first metric and the second metric may even include different process variables in a fault signature for the same detected fault. In one embodiment, each fault signature, and thus each fault class associated with the fault signature, is applicable to a single metric that was used in the generation of the fault signature. For example, a fault signature may include ranked contributions to a fault in accordance with the T2 metric. If a detected fault has the same ranked contributions as calculated by the Q metric, there is no match between the fault signature and the detected fault. If, on the other hand, the detected fault has the same ranked contributions as calculated by the T2 metric, there is a match between the fault signature and the detected fault.

In an alternative embodiment, at least some fault signatures and fault classes are metrics independent. A metrics independent fault signature may be generated in accordance with a first metric (e.g., T2), and match a detected fault that has the same ranked contributions as calculated by a second metric (e.g., CMI). In one embodiment, a relationship is determined between fault signatures of a first metric and fault signatures of a second metric. This relationship may be used to apply fault signatures produced by the first metric to faults as detected by the second metric. Alternatively, when a fault signature is generated, it may be generated in such a way that it is divorced from the metric that was originally used to create it. For example, when a fault signature is generated, it may be stored as a list of contributing process variables ranked by the magnitude of contribution to a fault, without storing actual required measured magnitudes of the process variables. The same ranked list may apply, for example, to both a T2 and a CMI metric, or to both a Q and a CMI metric. Therefore, even though, for example, a fault signature was generated using the T2 or the Q metric, the fault signature may be used for a fault diagnosed with the CMI metric with accurate results.

In one embodiment, each fault signature, and thus each fault class associated with the fault signature, is applicable to a single recipe and/or process that was used to generate the fault signature (e.g., the process/recipe from which the process data was collected). For example, some faults may be associated with specific operating parameters that occur only for a specific recipe. Alternatively, some fault signatures and fault classes identify faults that are recipe/process independent. Thus, the fault signatures and fault classes may themselves be recipe and/or process independent. Examples of such recipe/process independent faults include faults that are associated with sensor behavior (e.g., sensor output, statistics of sensors, etc.). For example, if a fault class indicates that a temperature sensor has failed, that temperature sensor will have failed regardless of recipe or process. Therefore, the fault class that represents the failed temperature sensor may be applicable to multiple recipes and processes.

In one embodiment, recipe independent classes may be used for two or more recipes that are processed by a similar tool and/or processing chamber. This allows a multivariate statistical model for a specific combination of recipe, tool and chamber to adopt fault classes from other recipes, instead of having to experience the faults individually. In another embodiment, the recipe independent classes may be applicable to all manufacturing machines 110 having a matching tool type.

Some fault classes may be partially recipe independent. Such fault classes may be shared between recipes that are similar (e.g., recipes that include similar steps, chemical reactions, temperatures, pressures, etc.). For example, as a recipe is incrementally changed with minor changes, the same fault classes and/or same multivariate statistical model may continue to be used. Recipes that are not similar may not share partially independent fault classes. However, dissimilar recipes may still share recipe independent fault classes.

Each of the fault signatures is associated with one or more fault classes stored in the fault diagnosis database 140. The fault classes may indicate an actual problem that generated a current fault, or a probable cause of the current fault. For example, if the fault signature indicates that the greatest contributing process variable was silane flow rate, the fault class may indicate that a valve that feeds silane into a chamber has malfunctioned.

The fault classes each include one or more parameters that collectively define the fault class. In one embodiment, a fault class includes a single parameter (e.g., a single database field) that describes the fault class with sufficient specificity to be meaningful to a user. In another embodiment, a fault class includes multiple parameters that specify, for example, a specific machine, a specific component within a machine, etc. to which the fault class applies. For example, a fault class may be for an upper chamber liner that needs cleaning in a specific manufacturing machine 110.

Fault reporter 165 generates fault reports indicating which fault class or fault classes 145 apply to a current fault. The fault reports may be sent to one or more clients (not shown) (e.g., local computers, remote computers, personal digital assistances (PDAs), pagers, cell phones, etc.) that are networked to the statistical process monitoring apparatus 105. Fault reporter 165 may also cause manufacturing machines 110 to be shut down, cause a machine to alarm, or cause other appropriate actions.

Figure 2:
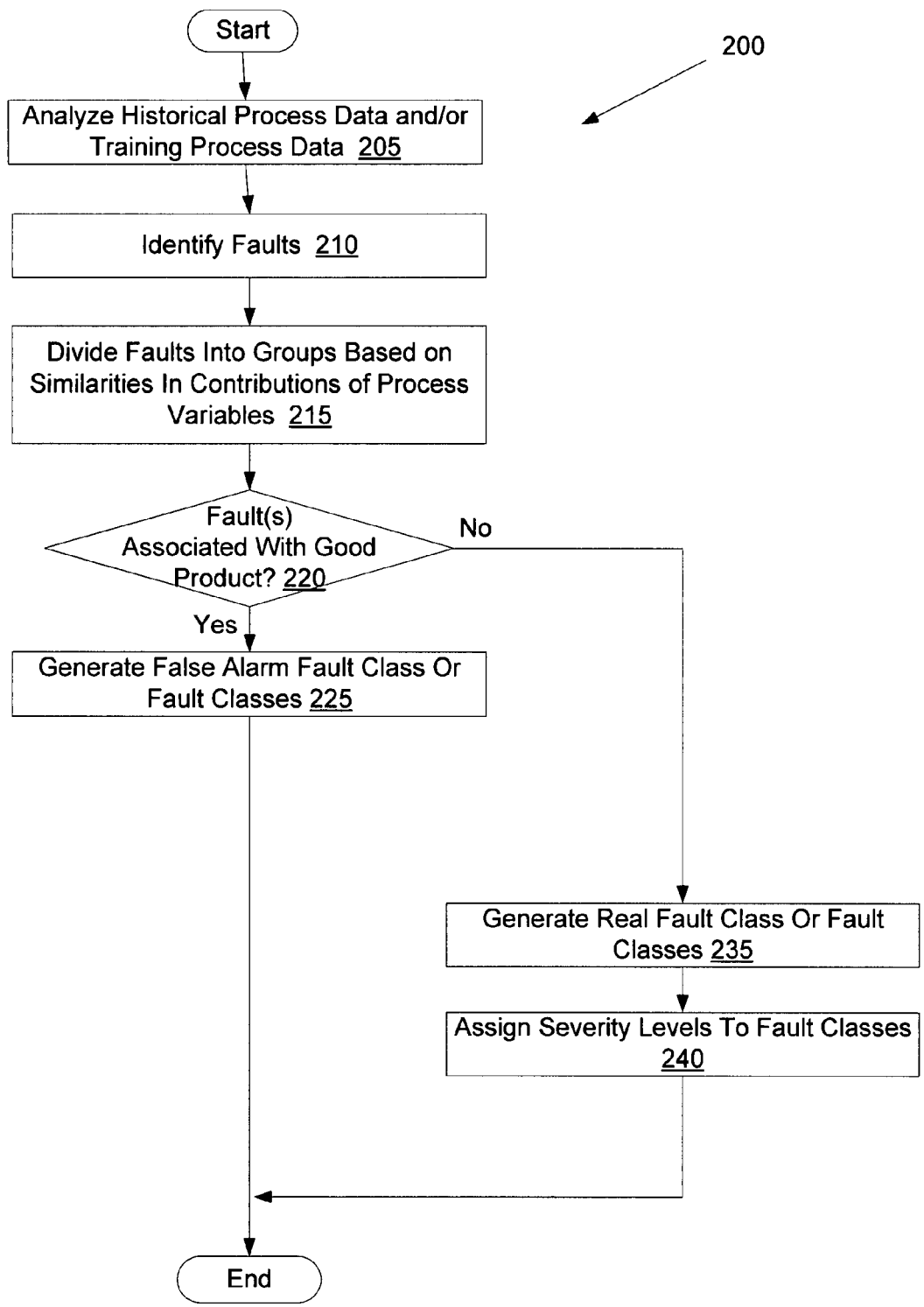
FIG. 2 illustrates a flow diagram of one embodiment for a method of generating fault classes.

FIG. 2 illustrates a flow diagram of one embodiment for a method 200 of generating fault classes. The method may be performed by processing logic that may comprise hardware (e.g., circuitry, dedicated logic, programmable logic, microcode, etc.), software (such as instructions run on a processing device), or a combination thereof. In one embodiment, method 200 is performed by the statistical process monitoring apparatus 105 of FIG. 1.

Method 200 may be performed automatically at the time that a multivariate statistical model is created. Thereby, fault classes and fault signatures may be available to diagnose faults before any customer product is processed. Alternatively, method 200 may be performed after a multivariate statistical model is generated, such as to add additional fault classes and fault signatures to an existing multivariate statistical model.

Referring to FIG. 2, method 200 begins with analyzing historical process data and/or training process data (block 205). Training process data includes data that is collected during a training period. Historical process data includes process data collected before a multivariate statistical model is generated (e.g., data collected before the training period). In one embodiment, the training process data and/or historical process data is acquired from a process measurement database. Alternatively, training process data may be acquired as it is produced by one or more of manufacturing machines, sensors, and process controllers. The process data may include, for example, chamber temperature, pressure, gas flow rates, etc.

At block 210, faults are identified based on the historical and/or training process data. The process data may be indicative of a fault if, for example, the temperature is too high or too low, the gas flow rates are erratic, the pressure is different than is required for a current process, etc. The fault may have been intentionally induced to generate the process data, or the fault may have been unintentionally produced.

At block 215, the identified faults are divided into groups based on similarities in the contributions of process variables to the faults. The groups of faults may include any number of faults, from a single fault to, for example, hundreds of faults. In one embodiment, the relative contributions of process variables are compared to determine similarities in faults. In one embodiment, fault signatures are compared between faults for grouping, as described below with reference to FIG. 3.

Returning to FIG. 2, at block 220, processing logic determines whether any of the faults (or fault groups) are associated with "good" product. Good product may include product that meets specification requirements, and product that was ultimately determined to satisfy quality requirements. For those faults and fault groups that are associated with good product, the method proceeds to block 225. For those faults and fault groups that are not associated with good product, the method proceeds to block 235.

At block 225, a false alarm fault class is generated for each different fault group associated with good product. A false alarm fault class indicates that the fault is not caused by any malfunction or problem, and that product that was processed when the fault occurred will meet quality requirements. The method then ends.

At block 235, a "real" fault class is generated for each fault group associated with failed product. A real fault class is a fault class that identifies a fault other than a false alarm. Each real fault class may indicate a fault cause. Thereby, when the fault is triggered in future processing, users may immediately know likely reasons for the fault.

At block 240, a severity level may be assigned to one or more of the real fault classes. The severity level may indicate a likelihood that the faults of the fault class will cause failed product. In one embodiment, the severity level is automatically assigned to the fault class based on, for example, knowledge of how much product was scrapped. Alternatively, severity levels may be input by a user.

Figure 3:
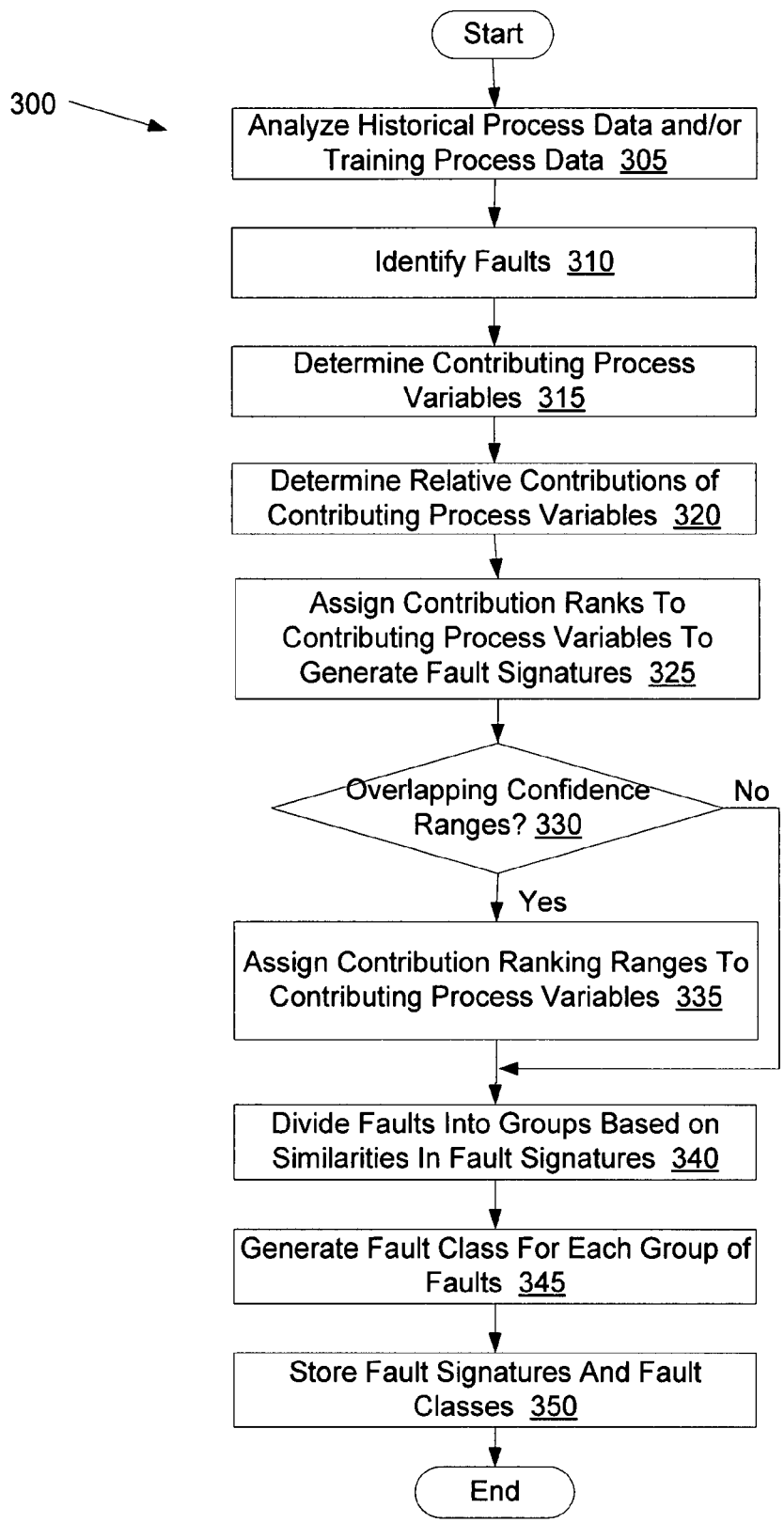
FIG. 3 illustrates a flow diagram of another embodiment for a method of generating fault classes.

FIG. 3 illustrates a flow diagram of another embodiment for a method 300 of generating fault classes. The method may be performed by processing logic that may comprise hardware (e.g., circuitry, dedicated logic, programmable logic, microcode, etc.), software (such as instructions run on a processing device), or a combination thereof. In one embodiment, method 300 is performed by the statistical process monitoring apparatus 105 of FIG. 1.

Referring to FIG. 3, method 300 begins with analyzing historical process data and/or training process data (block 305). At block 310, faults are identified from the historical and/or training process data.

At block 315, process logic determines which process variables contributed to each of the faults. At block 320, relative contributions of process variables that contributed to the fault are determined. Contributing process variables may be ranked in an order that corresponds to the relative magnitudes of their respective contributions, hereinafter referred to as fault contributions. The respective fault contributions of the process variables can be determined by any conventional statistical method. One exemplary method of determining relative contributions of process variables to a detected fault is disclosed in S. Joe Qin, Sergio Valle, Michael J. Piovoso, "On Unifying Multiblock Analysis with Application to Decentralized Process Monitoring," J. Chemometrics 2001, vol. 15, pages 715-742, which is herein incorporated by reference. Another exemplary method of determining relative contributions of process variables to a detected fault is disclosed in A. K. Conlin, E. B. Martin, A. J. Morris, "Confidence Limits For Contribution Plots," J. Chemometrics 2000, col. 14, pages 725-736, which is herein incorporated by reference. Yet another exemplary method of determining relative contributions of process variables to a detected fault is disclosed in Johan A. Westerhuis, Stephen P. Gurden, Age K. Smilde, "Generalized Contribution Plots in Multivariate Statistical Process Monitoring," Chemometrics and Intelligent Laboratory Systems 2000, vol. 51, pages 95-114, which is herein incorporated by reference. Other methods of determining relative contributions may also be used.

In one embodiment, the fault contributions are independent of a statistical method used to determine the fault contributions. Accordingly, parameters specific to certain statistical methods (e.g., covariance matrices, principal component eigenvectors, etc.) may not be incorporated into the fault class and/or a fault signature associated with the fault class. Therefore, the fault class may be equally applicable to any appropriate statistical methods (e.g., statistical methods with adaptive models (e.g., models that adapt certain parameters over time) and statistical methods that use static models). In the case of a statistical method using an adaptive model, the model may include principal components analysis (PCA) in which a number of principal components is adapted and/or a transformation from process variable space to principal component space is adapted.

In one embodiment, fault contributions of the process variables are determined independently by two or more different statistical methods (e.g., with a static model and an adaptive model). This may be advantageous because different statistical models may more accurately determine fault contributions for different faults.

At block 325, contribution ranks are assigned to contributing process variables to generate a new fault signature. In one embodiment, a subset of the contributing process variables is selected. The subset may include those process variables whose fault contribution is greater than a contribution threshold value, hereinafter referred to as the significance limit. The significance limit may be calculated according to various methods, including for example the methods of the Qin, et al., Conlin et al., and Westerhuis et al. discussed above. Consecutively numbered rankings may then be assigned to the process variables in the subset based on the order of relative magnitudes of their respective contributions.

Process variables outside of the selected subset (fault contribution less than the significance limit) may be assigned a fault contribution ranking of none or zero, or may be omitted from the fault signature. In one embodiment, the significance limit is predetermined. Alternatively, the significance limit may be determined at the time that the new signature value is generated using one or more statistical methods (e.g., a statistical method used to determine each process variable's respective fault contribution). Use of a significance limit may improve noise immunity by excluding from a diagnosis of a given fault all process variables whose contribution to that fault is statistically insignificant.

In one embodiment, there is no limit on the number of process variables that may be included in a new fault signature. Therefore, any number of process variables may be included in a fault signature, so long as those process variables each have fault contributions that meet the significance limit. Alternatively, an upper and/or lower limit may be placed on the number of contributing process variables to a fault signature.

At block 330, processing logic determines whether the contributing process variables have respective fault contributions that differ by less than a threshold value, hereinafter referred to as the variation limit. The variation limit may be user selected or selected automatically. The variation limit may be a fixed value, or it may be a relative value (e.g., based on a percentage of the fault contribution of one of the process variables). In one embodiment, a statistical confidence range is calculated for the fault contribution of each process variable. The variation limit may be based on the calculated statistical confidence ranges for the process variables. In one embodiment, the process variables differ by less than the variation limit if they have overlapping confidence ranges.

If the process variables differ by less than the variation limit (e.g., have overlapping confidence ranges), the method proceeds to block 335. If the process variables do not differ by less than the variation limit, the method proceeds to block 340. In one embodiment, the method proceeds to block 340 whether or not the process variables differ by less than the variation limit.

At block 335, contribution ranking ranges are assigned to one or more contributing process variables. Each contribution ranking range includes contribution ranks of each process variable that differs by less than the variation limit. Each of these process variables are assigned a ranking range that includes both that process variable's own contribution rank and the contribution ranks of the other included process variables. In one embodiment, the ranking range is a range of consecutively numbered contribution ranks. For example, a ranking range may be 1-2, which includes the contribution rank 1 of a first process variable and the contribution rank 2 of a second process variable. Different process variables may have identical or overlapping ranking ranges. Defining fault signatures by ranking ranges instead of or in addition to absolute contribution ranks may improve noise immunity (e.g., where a relative ranking between process variables is likely to be interchanged by expected statistical fluctuations).

At block 340, the faults are divided into groups based on similarities in the fault signatures. In one embodiment, all faults having a fully matching fault signature are assigned together to a fault group. Alternatively, some or all fault groups may include faults having fault signatures that only partially match the fault signatures of other faults in the group.

At block 345, a fault class is generated for each group of faults. In one embodiment, each fault class is established by assigning one or more parameters that collectively define the fault class. The one or more parameters may define the fault class with sufficient specificity to identify one or more possible fault causes. A fault class may be established after a single occurrence of a particular fault.

At block 350, the fault signatures and fault classes are stored (e.g., in the fault diagnosis database). In one embodiment, the actual contribution values (e.g, 0.9, 0.5, etc.) of each process variable to the fault signatures are not stored, and instead the contribution ranking is stored (e.g., 1, 2, 3, etc.). Alternatively, the actual contribution values may be stored, or both the contribution values and the contribution rankings may be stored.

Figure 4A:
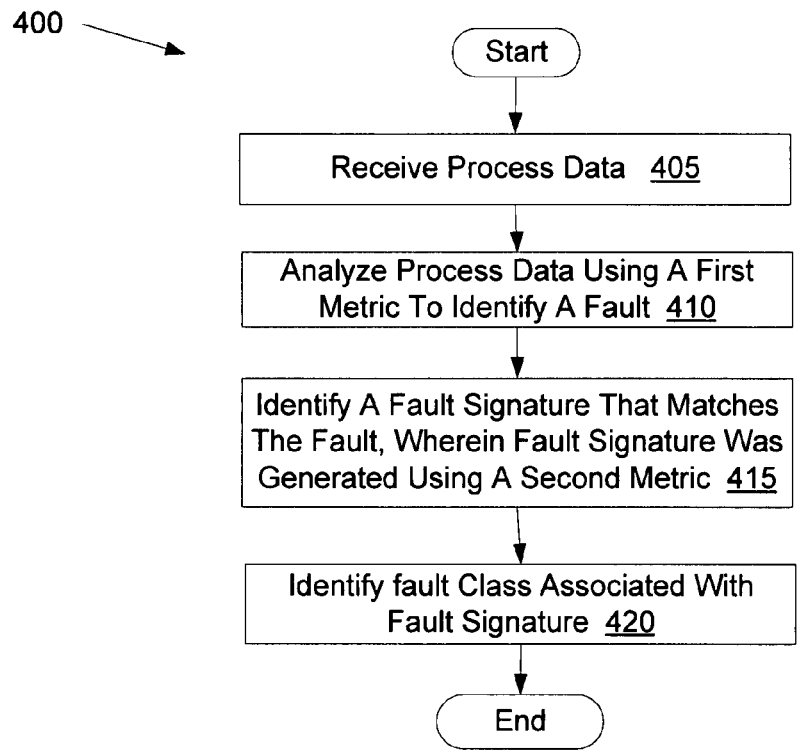
FIG. 4A illustrates a flow diagram of one embodiment for a method of diagnosing faults by using metrics independent fault signatures.

FIG. 4A illustrates a flow diagram of one embodiment for a method 400 of diagnosing faults by using metrics independent fault signatures. The method may be performed by processing logic that may comprise hardware (e.g., circuitry, dedicated logic, programmable logic, microcode, etc.), software (such as instructions run on a processing device), or a combination thereof. In one embodiment, method 400 is performed by the statistical process monitoring apparatus 105 of FIG. 1.

Referring to FIG. 4A, method 400 begins with receiving process data (block 405). The process data may be received from one or more of sensors, manufacturing machines, process controllers and a process measurement database. At block 410, the process data is analyzed using a first metric to identify a fault. In one embodiment, the first metric is the CMI metric. Alternatively, the first metric may be, for example, the T2 or the Q metric. Analyzing the process data using the first metric may include using the first metric to determine process variables that contributed to the fault, and relative contributions of the contributing process variables.

At block 415, processing logic identifies a fault signature that matches the fault, wherein the fault signature was generated using a second metric. For example, if the first metric is the CMI metric, the second metric may be the Q or the T2 metric. A match may occur when contributing process variables to the detected fault are the same as, or similar to, contributing process variables in a fault signature. A fault signature may be generated with a metric by using the metric to determine process variables that contributed to a fault, and relative contributions of the contributing process variables.

At block 420, processing logic identifies a fault class that is associated with the fault signature. In one embodiment, each fault signature is associated with a single fault class. Alternatively, multiple fault classes may be associated with a fault signature. This may occur, for example, where two fault classes have the same fault signature. The method then ends.

Figure 4B:
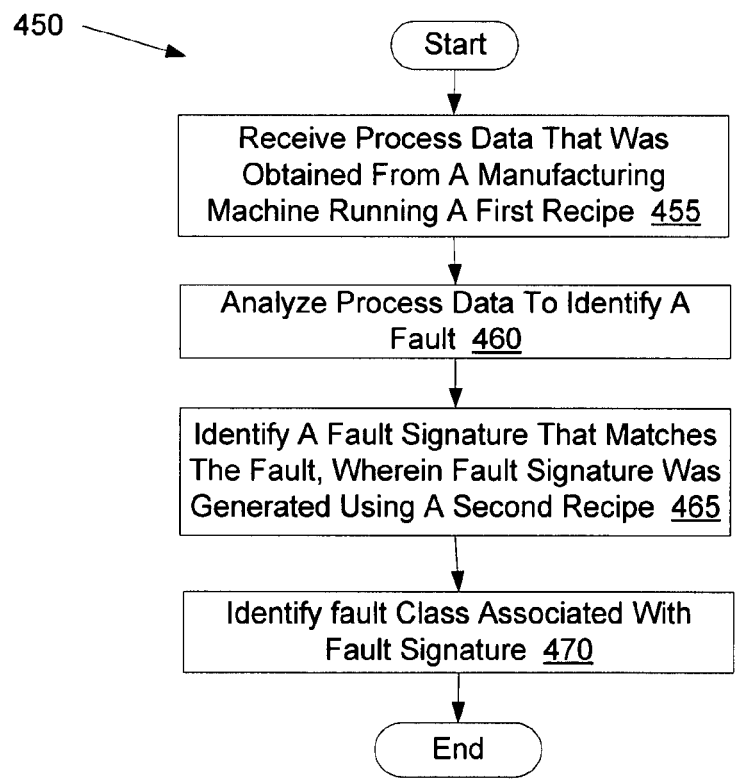
FIG. 4B illustrates a flow diagram of one embodiment for a method of diagnosing faults by using recipe independent fault signatures.

FIG. 4B illustrates a flow diagram of one embodiment for a method 450 of diagnosing faults by using recipe independent fault signatures. The method may be performed by processing logic that may comprise hardware (e.g., circuitry, dedicated logic, programmable logic, microcode, etc.), software (such as instructions run on a processing device), or a combination thereof. In one embodiment, method 450 is performed by the statistical process monitoring apparatus 105 of FIG. 1.

Referring to FIG. 4B, method 450 begins with receiving process data that was obtained from a first manufacturing machine using a first recipe (block 455). The process data may be received from sensors, manufacturing machines, process controllers and/or a process measurement database. The first recipe may be, for example, a recipe to grow an oxygen layer on a work piece, to deposit a dielectric on a work piece, to etch away a layer of material from a work piece, etc.

At block 460, the process data is analyzed to identify a fault. Analyzing the process data may include determining process variables that contributed to the fault, and relative contributions of the process variables.

At block 465, processing logic identifies a fault signature that matches the fault, wherein the fault signature was generated using a second recipe. In one embodiment, the fault signature was generated using the second recipe on the first manufacturing machine. Alternatively, the fault signature may have been generated using the second recipe on a second manufacturing machine that has a matching machine type to the first manufacturing machine. A match may occur when contributing process variables to the detected fault are the same as, or similar to, contributing process variables in a fault signature.

At block 470, processing logic identifies one or more fault classes associated with the fault signature. The method then ends.

In one embodiment, method 400 of FIG. 4A and method 450 of FIG. 4B may be combined. Accordingly, some fault signatures may be both metrics independent and recipe independent. Other fault signatures may be only recipe independent or metrics independent, or neither metrics independent nor recipe independent.

Figure 5:
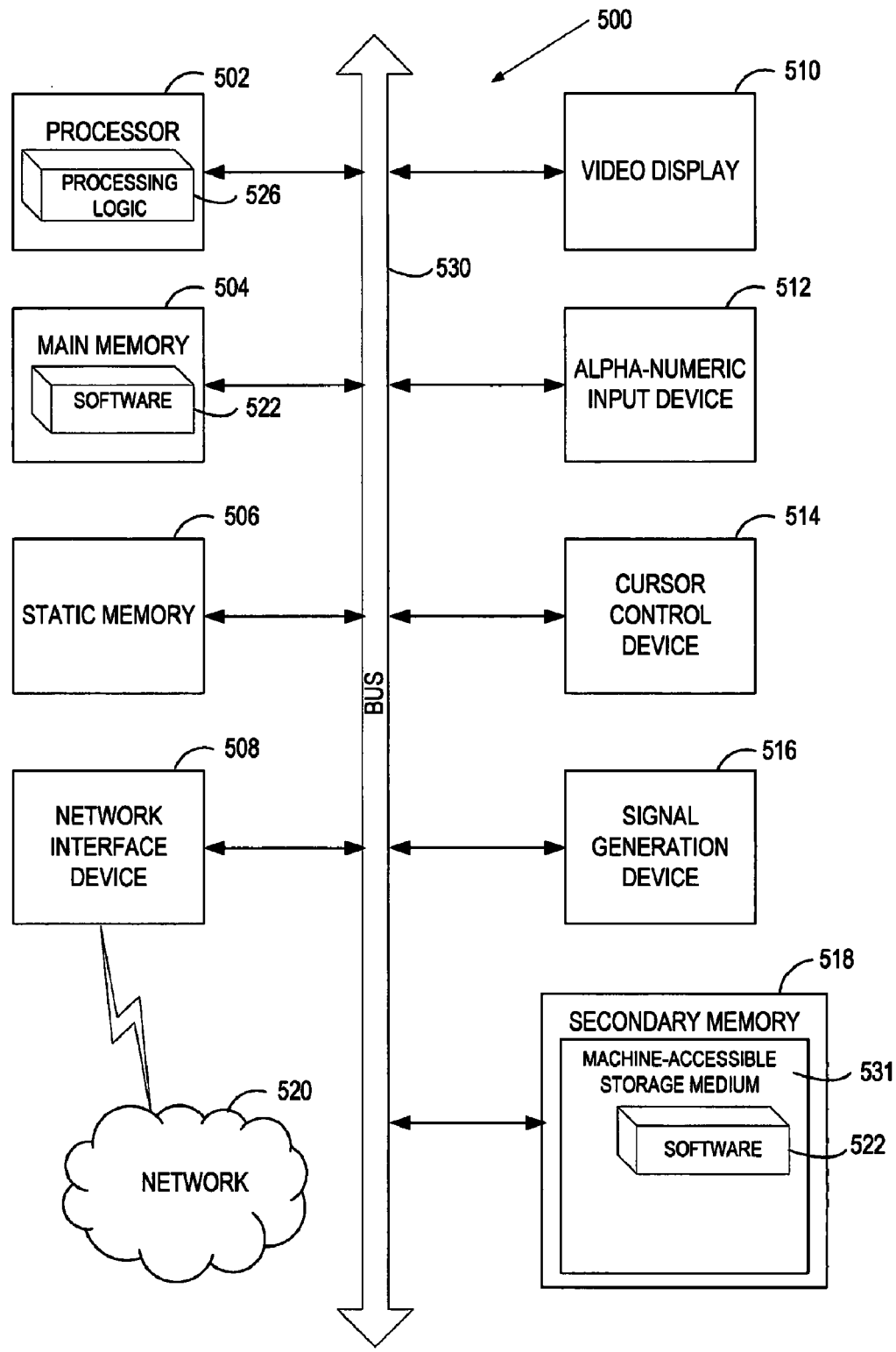
FIG. 5 illustrates a diagrammatic representation of a machine in the exemplary form of a computer system within which a set of instructions, for causing the machine to perform any one or more of the methodologies discussed herein, may be executed.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-accessible storage media. The software 522 may further be transmitted or received over a network 520 via the network interface device 508.

The machine-accessible storage medium 531 may also be used to store data structure sets that define user identifying states and user preferences that define user profiles. Data structure sets and user profiles may also be stored in other sections of computer system 500, such as static memory 506.

While the machine-accessible storage medium 531 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method of diagnosing faults, comprising:
   analyzing, by a computer system hosting a statistical process monitoring apparatus, process data using a first metric to identify a fault, wherein the process data was obtained from a manufacturing machine running a first recipe;
   identifying, by the computer system, a fault signature that matches the fault, wherein the fault signature was generated using at least one of a second metric and a second recipe, wherein the fault signature ranks a plurality of process conditions representative of one or more faults in accordance with a contribution of each of the plurality of process conditions, wherein the fault signature does not include a process condition with a contribution that compares in a predetermined manner to a threshold; and
   identifying, by the computer system, at least one fault class that is associated with the fault signature, wherein each fault class identifies a cause of one or more faults represented by the fault signature.

2. The method of claim 1, wherein the at least one fault class applies to two or more different metrics.

3. The method of claim 1, wherein the first metric is a combined multivariate index (CMI) metric, and the second metric is one of a Hotelling's T-square (T2) metric, and a Square Prediction Error (Q) metric.

4. The method of claim 1, wherein the at least one fault class applies to two or more different recipes.

5. A non-transitory machine-accessible storage medium including data that, when accessed by a machine, cause the machine to perform a method comprising:
   analyzing process data using a first metric to identify a fault, wherein the process data was obtained from a manufacturing machine running a first recipe;
   identifying a fault signature that matches the fault, wherein the fault signature was generated using at least one of a second metric and a second recipe, wherein the fault signature ranks a plurality of process conditions representative of one or more faults in accordance with a contribution of each of the plurality of process conditions, wherein the fault signature does not include a process condition with a contribution that compares in a predetermined manner to a threshold; and
   identifying at least one fault class that is associated with the fault signature, wherein each fault class identifies a cause of the one or more faults represented by the fault signature.

6. The non-transitory machine-accessible storage medium of claim 5, wherein the at least one fault class applies to two or more different metrics.

7. The non-transitory machine-accessible storage medium of claim 6, wherein the first metric is a combined multivariate index (CMI) metric, and the second metric is one of a Hotelling's T-square (T2) metric, and a Square Prediction Error (Q) metric.

8. The non-transitory machine-accessible storage medium of claim 5, wherein the at least one fault class applies to two or more different recipes.

9. A statistical process monitoring system, comprising:
   a fault detector coupled with a manufacturing machine, the fault detector to receive process data produced using a first recipe from the manufacturing machine, and to analyze the process data using a first metric to identify a fault;
   a database to store a plurality of fault signatures, each of the fault signatures being associated with at least one fault class; and
   a fault diagnoser coupled with the fault detector and coupled with the database, the fault diagnoser to identify a matching fault signature that matches the fault from the plurality of fault signatures, wherein the matching fault signature was generated using at least one of a second metric and a second recipe with the manufacturing machine, wherein the fault signature ranks a plurality of process conditions representative of one or more faults in accordance with a contribution of each of the plurality of process conditions, wherein the fault signature does not include a process condition with a contribution that compares in a predetermined manner to a threshold, and to identify at least one fault class that is associated with the fault signature, wherein the fault class identifies a cause of the one or more faults represented by the fault signature.

10. The statistical process monitoring system of claim 9, wherein the at least one fault class applies to two or more different metrics.

11. The statistical process monitoring system of claim 10, wherein the first metric is a combined multivariate index (CMI) metric, and the second metric is one of a Hotelling's T-square (T2) metric, and a Square Prediction Error (Q) metric.

12. The statistical process monitoring system of claim 9, wherein the at least one fault class applies to two or more different recipes.

13. A computer-implemented method of diagnosing faults, comprising:
   analyzing, by a computer system hosting a statistical process monitoring apparatus, process data from at least one of historical data and training data to identify a plurality of faults;
   determining, by the computer system, one or more process variables that contributed to the plurality of faults;
   determining, by the computer system, a relative contribution of each of the one or more process variables to the plurality of faults;
   generating, by the computer system, a fault signature for each of the plurality of faults, the fault signature having relative contribution ranges that include the relative contributions of each of the one or more process variables, wherein the fault signature does not include a process variable with a relative contribution that compares in a predetermined manner to a threshold;
   dividing, by the computer system, the plurality of faults into groups based on similarities in fault signatures; and
   generating, by the computer system, a fault class for each of the groups of faults, wherein each fault class identifies a cause of a corresponding group of faults.

14. The method of claim 13, further comprising:
   determining that at least one fault is associated with a product that meets specification requirements; and
   classifying a fault class generated for the at least one fault as a false alarm.

15. The method of claim 13, further comprising:
   determining that at least one fault is associated with a product that does not meet specification requirements;
   identifying a fault class generated for the at least one fault as a real fault; and
   receiving user input to classify the generated fault class.

16. The method of claim 15, further comprising:
   assigning a severity level to the fault class.

17. The method of claim 13, wherein the plurality of faults include at least two faults having similar relative contributions of at least some of the one or more process variables, further comprising:
   generating a single fault signature for the at least two faults, the single fault signature having relative contribution ranges that include the relative contributions of the process variables of each of the at least two faults; and
   generating a single fault class for the at least two faults.

18. The method of claim 13, wherein the fault signatures are generated automatically when a multivariate statistical model is generated.

19. A non-transitory machine-accessible storage medium including data that, when accessed by a machine, cause the machine to perform a method comprising:
   analyzing process data from at least one of historical data and training data to identify a plurality of faults;
   determining one or more process variables that contributed to the plurality of faults;
   determining a relative contribution of each of the one or more process variables to the plurality of faults;
   generating a fault signature for each of the plurality of faults, the fault signature having relative contribution ranges that include the relative contributions of each of the one or more process variables, wherein the fault signature does not include a process variable with a relative contribution that compares in a predetermined manner to a threshold;
   dividing the plurality of faults into groups based on similarities in fault signatures; and
   generating a fault class for each of the groups of faults, wherein each fault class identifies a cause of a corresponding group of faults.

20. The non-transitory machine-accessible storage medium of claim 19, the method further comprising:
   determining that at least one fault is associated with a product that meets specification requirements; and
   classifying a fault class generated for the at least one fault as a false alarm.

21. The non-transitory machine-accessible storage medium of claim 19, the method further comprising:
   determining that at least one fault is associated with a product that does not meet specification requirements;
   identifying a fault class generated for the at least one fault as a real fault; and
   receiving user input to classify the generated fault class.

22. The non-transitory machine-accessible storage medium of claim 21, the method further comprising:
   assigning a severity level to the fault class.

23. The non-transitory machine-accessible storage medium of claim 21, wherein the plurality of faults include at least two faults having similar relative contributions of at least some of the one or more process variables, further comprising:
   generating a single fault signature for the at least two faults, the single fault signature having relative contribution ranges that include the relative contributions of the process variables of each of the at least two faults; and
   generating a single fault class for the at least two faults.

24. The non-transitory machine-accessible storage medium of claim 21, wherein the fault signatures are generated automatically when a multivariate statistical model is generated.

25. A statistical process monitoring system, comprising:
   a database to store a at least one of historical process data and training process data;
   a fault detector coupled with the database to analyze at least one of the historical process data and training process data to identify a plurality of faults; and
   a fault diagnoser coupled with the fault detector to determine one or more process variables that contributed to the plurality of faults, to determine a relative contribution of each of the one or more process variables to the plurality of faults, to generate a fault signature for each of the plurality of faults, the fault signature having relative contribution ranges that include the relative contributions of each of the one or more process variables, the fault signature not including a process variable with a relative contribution that compares in a predetermined manner to a threshold, to divide the plurality of faults into groups based on similarities in fault signatures, and to generate a fault class for each of the groups of faults, wherein each fault class identifies a cause of a corresponding group of faults.

26. The statistical process monitoring system of claim 25, wherein the fault diagnoser to determine that at least one fault is associated with a product that meets specification requirements, and to generate a false alarm fault class.

27. The statistical process monitoring system of claim 25, wherein the fault diagnoser to determine that at least one fault is associated with a product that does not meet specification requirements, to generate a real fault class, and to receive user input to classify the real fault class.

28. The statistical process monitoring system of claim 27, wherein the fault diagnoser to assign a severity level to the fault class.

29. The statistical process monitoring system of claim 25, wherein the plurality of faults include at least two faults having similar relative contributions of at least some of the one or more process variables, the fault diagnoser to generate a single fault signature and a single fault class for the at least two faults, the single fault signature having relative contribution ranges that include the relative contributions of the process variables of each of the at least two faults.

\* \* \* \* \*